US012763106B1

(12) United States Patent
Watanabe et al.

(10) Patent No.: US 12,763,106 B1
(45) Date of Patent: Oct. 13, 2026

(54) MAGNETIC DISK DEVICE AND DEFECT DETECTION METHOD

(71) Applicants: Kabushiki Kaisha Toshiba, Kawasaki (JP); Toshiba Electronic Devices & Storage Corporation, Kawasaki (JP)

(72) Inventors: Toru Watanabe, Kawasaki (JP); Jyun Aoki, Kawasaki (JP); Takeshi Shibasaki, Kamakura (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/357,924

(22) Filed: Oct. 14, 2025

(30) Foreign Application Priority Data

May 22, 2025 (JP) ................................ 2025-085702

(51) Int. Cl.
*G11B 20/18* (2006.01)
*G11B 23/50* (2006.01)

(52) U.S. Cl.
CPC .................................... *G11B 23/50* (2013.01)

(58) Field of Classification Search
CPC ........... G11B 27/36; G11B 5/09; G11B 20/10; G11B 20/0013; G11B 5/00; G11B 11/10; G11B 11/105; G11B 2005/0021; G11B 5/02; G11B 5/54; G11B 5/455; G11B 5/6076; G11B 20/18
USPC ........................................................... 360/75
See application file for complete search history.

(56) References Cited

U.S. PATENT DOCUMENTS

| | | | |
|---|---|---|---|
| 9,123,381 | B2 | 9/2015 | Anaya-Dufresne et al. |
| 9,262,249 | B1 * | 2/2016 | Xie ...................... G06F 11/073 |
| 9,881,642 | B2 | 1/2018 | Zhang et al. |
| 11,482,252 | B2 | 10/2022 | Watanabe |
| 2012/0120982 | A1 | 5/2012 | Anaya-Dufresne et al. |
| 2015/0364148 | A1 | 12/2015 | Peng et al. |
| 2016/0293203 | A1 | 10/2016 | Zhang et al. |
| 2022/0122636 | A1 | 4/2022 | Watanabe |

FOREIGN PATENT DOCUMENTS

| | | |
|---|---|---|
| JP | H08-167121 A | 6/1996 |
| JP | H11-39654 A | 2/1999 |

* cited by examiner

*Primary Examiner* — Nabil Z Hindi
(74) *Attorney, Agent, or Firm* — Kim & Stewart LLP

(57) ABSTRACT

According to one embodiment, a magnetic disk device includes a disk-shaped recording medium including a magnetic recording layer, a magnetic head that processes information on the magnetic recording layer, a thermal resistance sensor on the magnetic head, that detects a surface condition of the magnetic recording layer, and a controller including a defect detection circuit that detects presence or absence of a defect by comparing an output of the thermal resistance sensor with a defect detection threshold, a position detection circuit that detects a radial position of the magnetic head relative to the recording medium, an adjustment circuit that adjusts the defect detection threshold in accordance with a detected radial position.

10 Claims, 12 Drawing Sheets

MAGNETIC DISK DEVICE AND DEFECT DETECTION METHOD

CROSS-REFERENCE TO RELATED APPLICATIONS

This application is based upon and claims the benefit of priority from Japanese Patent Application No. 2025-085702, filed May 22, 2025, the entire contents of which are incorporated herein by reference.

FIELD

Embodiments described herein relate generally to a magnetic disk device and a method of detecting defects on a surface of a recording medium.

BACKGROUND

As a disk drive, for example, a magnetic disk device comprises a rotatable disk-shaped recording medium having a magnetic recording layer, and a magnetic head that records and reproduces data to/from the magnetic recording layer of the recording medium. The magnetic head includes a slider and a read head and a write head provided on the slider. The magnetic head performs recording and reproduction of information by relatively moving relative to the recording surface of the recording medium with a micro-gap of approximately 1 nm therebetween. Due to this configuration, it is required for the recording surface of the recording medium to have high smoothness.

However, the recording surface of the recording medium has defects including micro-protrusions having a height of approximately 3 to 8 nm, which are generated during the manufacturing process of the recording medium. When the magnetic head travels over the recording surface with a micro-gap, the magnetic head collides with the micro-protrusions. When such collisions with the micro-protrusions repeatedly occur, the magnetic head may be damaged, making it difficult to perform recording and reproduction.

DETAILED DESCRIPTION

Various embodiments will be described hereinafter with reference to the accompanying drawings. In general, according to one embodiment, a magnetic disk device comprises a disk-shaped recording medium including a magnetic recording layer, a magnetic head that processes information on the magnetic recording layer, a thermal resistance sensor provided on the magnetic head, that detects a surface condition of the magnetic recording layer, and a controller comprising a defect detection circuit that detects presence or absence of a defect by comparing an output of the thermal resistance sensor with a defect detection threshold, a position detection circuit that detects a radial position of the magnetic head relative to the recording medium, and an adjustment circuit that adjusts the defect detection threshold in accordance with the radial position detected by the position detection circuit.

Note that the disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings show schematic illustration rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

First Embodiment

Figure 1:
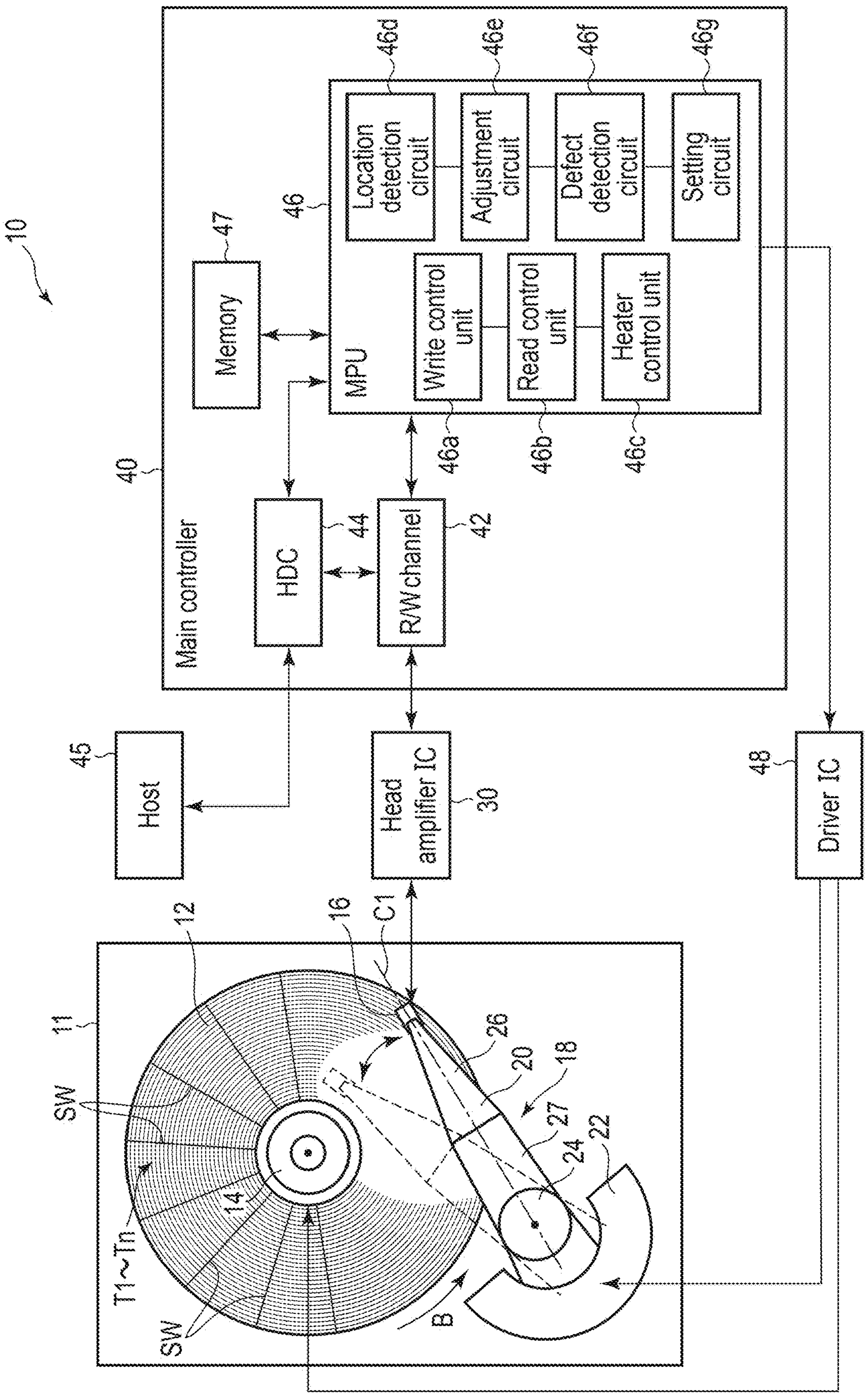
FIG. 1 is a block diagram schematically showing a hard disk drive (HDD) according to the first embodiment.
Figure 2:
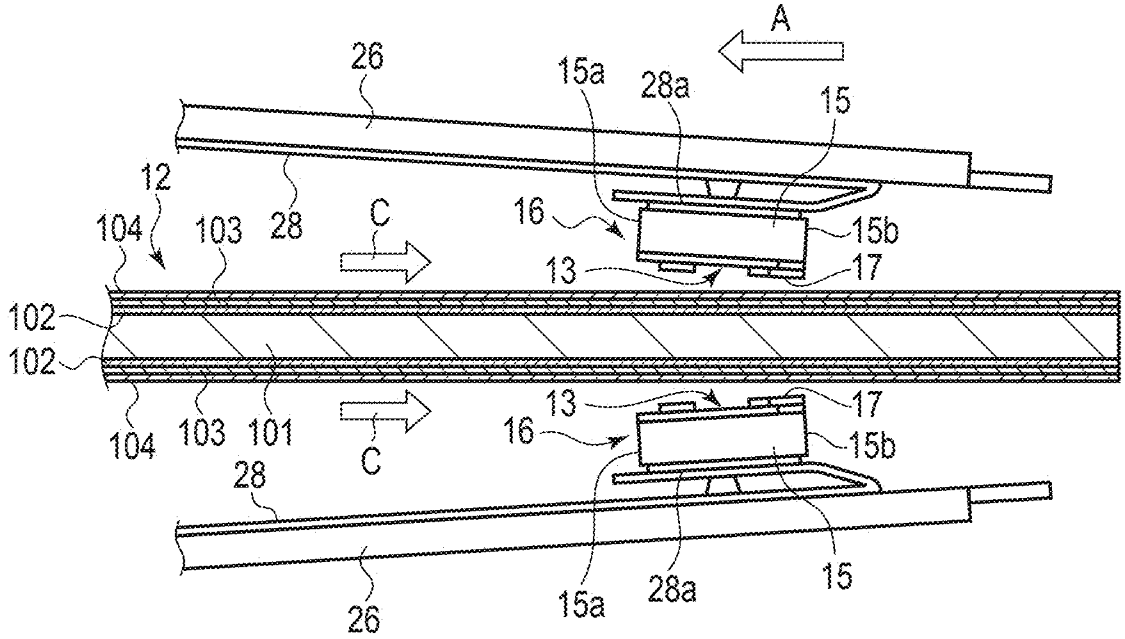
FIG. 2 is a side view schematically showing magnetic heads, a suspension, and a magnetic disk in the HDD.

As an example of the magnetic disk device, a hard disk drive (HDD) according to the first embodiment will be described in detail. FIG. 1 is a block diagram schematically showing the HDD of the first embodiment, and FIG. 2 is a side view showing magnetic heads in a flying state and a magnetic disk.

As shown in FIG. 1, the HDD 10 includes a rectangular housing 11, a magnetic disk 12 as a disk-shaped recording medium, disposed in the housing 11, a spindle motor 14 that supports and rotates the magnetic disk 12, and a plurality of magnetic heads 16 that perform data recording (write) and reproduction (read) with respect to the magnetic recording layer of the magnetic disk 12. The HDD 10 comprises a head actuator 18 that moves and positions the magnetic heads 16 on any track on the magnetic disk 12. The head actuator 18 includes a carriage assembly 20 that supports the magnetic heads 16 so as to be movable, and a voice coil motor (VCM) 22 that pivots the carriage assembly 20.

The HDD 10 comprises a controller including a head amplifier IC 30 that drives the magnetic heads 16, a main controller 40, and a driver IC 48. The head amplifier IC 30 is provided, for example, in the carriage assembly 20 and electrically connected to the magnetic heads 16. The head amplifier IC 30 includes a recording current supply circuit (recording current supply unit) that supplies recording current to the recording coil of the respective magnetic head 16, a heater power supply circuit that supplies drive power to the thermal actuator (heater) of the magnetic head 16, which will be described later, an amplifier that amplifies signals read by the magnetic head 16, a sensor amplifier that amplifies the output of a thermal resistance sensor provided on the magnetic head, and the like.

The main controller 40 and the driver IC 48 are configured on a control circuit board (not shown) provided on the rear surface side of the housing 11, for example. The main controller 40 comprises an R/W channel 42, a hard disk controller (HDC) 44, a microprocessor (MPU) 46, a memory 47, and the like. The main controller 40 is electrically connected to the magnetic head 16 via the head amplifier IC 30. The main controller 40 is electrically connected to the VCM 22 and the spindle motor 14 via the driver IC 48. The HDC 44 is connectable to the host computer 45.

In the main controller 40, for example, the MPU 46 includes a write control unit 46*a* that controls the write head, a read control unit 46*b* that controls the read head, and a heater control unit 46*c* that controls the power supplied to the thermal actuator. The MPU 46 further includes a position detection circuit 46*d* that detects the position of the magnetic head 16 in the radial direction (radial position) on the magnetic disk 12, an adjustment circuit 46*e* that adjusts (changes) the defect detection threshold in accordance with the detected radial position, and a defect detection circuit 46*f* that detects the presence or absence of defects (protrusions, recesses, etc.) in the magnetic recording layer based on the output value from the thermal resistance sensor and the adjusted defect detection threshold, a setting circuit 46*g* that sets the entire track where a defect is detected as a recording-prohibited track or a recording/reading-prohibited track, and the like. To the memory 47, various data such as inspection results, recording-prohibited tracks, heater power setting values, and defect detection thresholds are stored.

As shown in FIGS. 1 and 2, the magnetic disk 12 is configured as a perpendicular magnetic recording medium. The magnetic disk 12 includes a substrate 101 formed into a shape of a circular plate having a diameter of, for example, 96 mm (approximately 3.5 inches) and made of a non-magnetic material. On each of the surfaces of the substrate 101, a soft magnetic layer 102 made of a material exhibiting soft magnetic properties and serving as a base layer, and above this layer, a vertical magnetic recording layer 103 having magnetic anisotropy perpendicular to the surface of the magnetic disk 12 and a protective film 104 are stacked in this order. The magnetic disks 12 are mounted so as to be coaxial with each other on the hub of the spindle motor 14. The magnetic disks 12 are rotated at a predetermined speed in the direction indicated by arrow B by the spindle motor 14.

As shown in FIG. 1, on each surface (magnetic recording layer) of the magnetic disk 12, a number of concentric recording tracks T1 to Tn are formed. Each recording track includes a plurality of sectors arranged along the circumferential direction. Further, on each magnetic recording layer of the magnetic disk 12, a number of servo data areas SW extending in the radial direction (radial direction) are formed. The servo data areas SW are arranged at equal intervals along the circumferential direction. Each of the servo data areas SW stores data including position information.

The carrier assembly 20 includes a bearing portion 24 supported rotatably by the housing 11, a plurality of arms 27 and suspensions 26 extending from the bearing portion 24. The arms 27 and suspensions 26 have a central axis line C1 passing through the rotational center of the bearing portion 24.

The magnetic head 16 is supported at the extending end of each suspension 26. The magnetic head 16 is supported such that its center axis C1 is directed parallel to the center axis C1 of the suspension.

As shown in FIG. 2, the magnetic head 16 is electrically connected to the head amplifier IC 30 via a wiring member (flexible member) 28 provided in the carriage assembly 20. The magnetic head 16 is configured as a flying-type head and includes a slider 15 having substantially a rectangular parallelopiped shape and a head portion 17 formed at an end portion of an outflow end (trailing) side of the slider 15. The slider 15 is formed, for example, from a sintered body of alumina and titanium carbide (AlTiC), and the head portion 17 is formed from multiple layers of thin films. The slider 15 is mounted on the gimbal portion 28*a* of the wiring member 28.

The slider 15 has substantially a rectangular disk-facing surface (air bearing surface (ABS)) 13 facing the surface of the magnetic disk 12. The slider 15 is maintained in a state where it is flying a predetermined distance above the surface of the magnetic disk 12 by the airflow C generated between the disk surface and the ABS 13 due to the rotation of the magnetic disk 12. The direction of the airflow C is aligned with the rotation direction B of the magnetic disk 12. The slider 15 has a leading end 15*a* located on the inflow side of the airflow C and a trailing end 15*b* located on the outflow side of the airflow C. As the magnetic disk 12 rotates, the magnetic head 16 travels in the direction of the arrow A (head travel direction) with respect to the magnetic disk 12, which is opposite to the rotation direction B of the disk.

Figure 3:
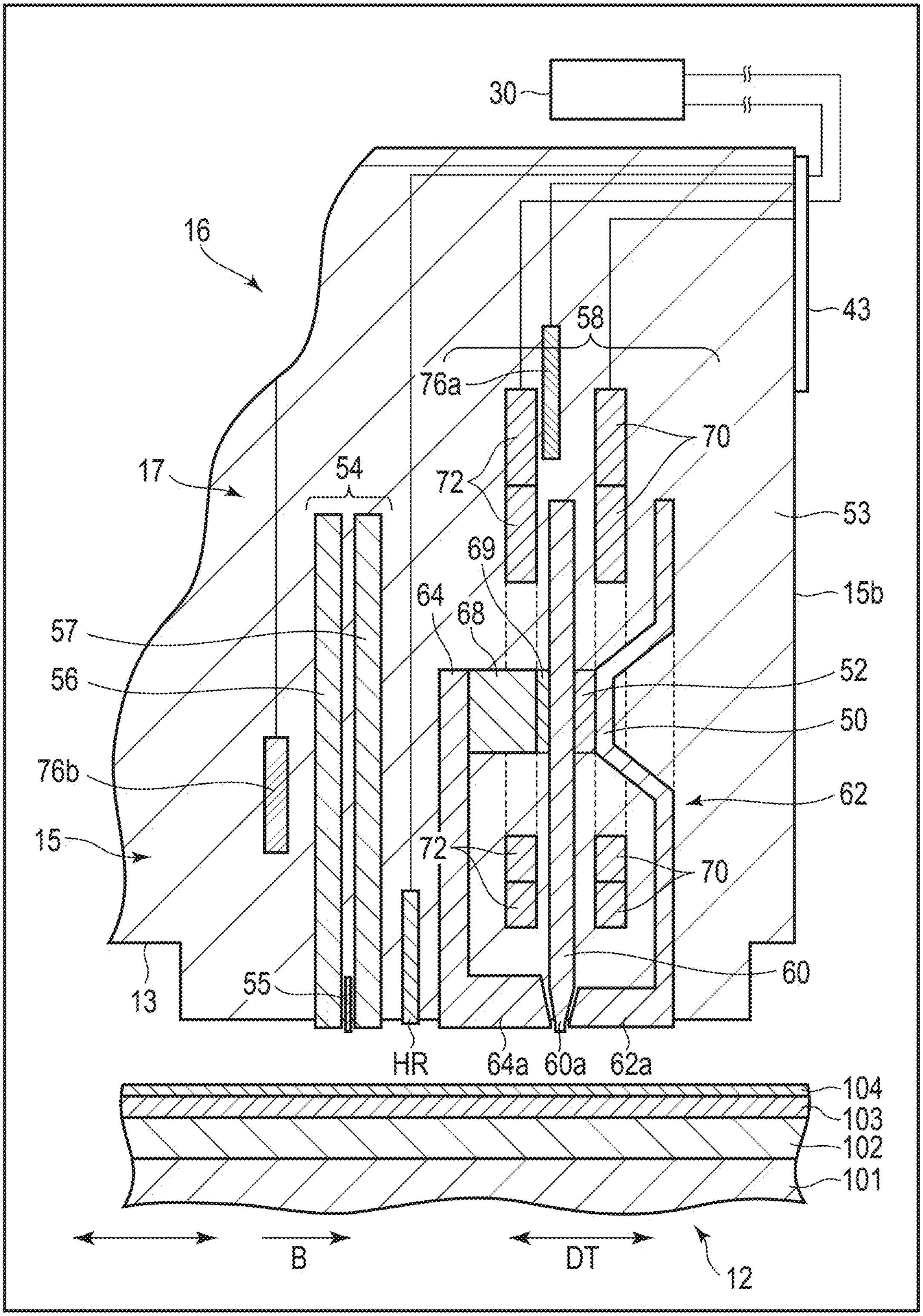
FIG. 3 is a cross-sectional view showing an enlarged view of a head portion of the magnetic head.

FIG. 3 is an enlarged cross-sectional view showing the head portion 17 of the magnetic head 16 and the magnetic disk 12.

As shown in FIG. 3, the head portion 17 includes a read head (, which may as well be referred to as a reproduction element) 54 and a write head (, which may as well be referred to as a recording element) 58 formed by a thin film process on the trailing end 15*b* of the slider 15, which constitute a separated head. The read head 54 and write head 58 are covered by a non-magnetic protective insulating film 53, except for the portion exposed to the ABS 13 of the slider 15. The protective insulating film 53 forms the outer shape of the head portion 17. Further, the head portion 17 includes a thermal resistance sensor HR that detects the surface condition (defect condition) of the magnetic disk surface, a first thermal actuator that controls the protrusion amount of the write head 58, and a second thermal actuator that controls the protrusion amount of the read head 54. Note that the surface condition of the magnetic disk 12 is defined as the presence or absence of defects (protrusions or recesses) on the magnetic disk surface, that is, the condition as to whether or not there are defects (protrusions or recesses) on the disk surface, as will be described later.

The longitudinal direction (circumferential direction) of the recording tracks formed on the perpendicular magnetic recording layer 103 of the magnetic disk 12 is defined as a track circumferential direction DT, and the width direction of the recording tracks perpendicular to the longitudinal direction is defined as a cross-track direction WT.

The read head 54 includes a magnetoresistance effect element 55, a first magnetic shielding film 56, and a second magnetic shielding film 57. The first magnetic shielding film 56 and the second magnetic shielding film 57 are arranged in the track circumferential direction DT such that they sandwich the magnetoresistance effect element 55 between the leading side (inflow side) and the trailing side (outflow side) of the magnetoresistance effect element 55. The magnetoresistance effect element 55, the first and second magnetic shielding films 56 and 57 extend substantially perpendicular to the ABS 13. The lower end portions (distal end portions) of the magnetoresistance effect element 55, the first and second magnetic shielding films 56 and 57 protrude slightly from the ABS 13.

The write head 58 is provided on the trailing end **15*b* side of the slider 15 with relative to the read head 54. The write head 58 includes a main pole 60 that generates a recording magnetic field perpendicular to the surface of the magnetic disk 12, a trailing shield 62 disposed on the trailing side of the main pole 60 so as to face the main pole 60 with a write gap therebetween, a leading shield 64 facing the leading side of the main pole 60, and a pair of side shields (not shown), which are formed to be integrated with the trailing shield 62. The main pole 60 and the trailing shield 62 constitute a first magnetic core, and the main pole 60 and the leading shield 64 constitute a second magnetic core. The write head 58 includes a first recording coil 70 wound around the first magnetic core and a second recording coil 72** wound around the second magnetic core.

The main pole 60 is formed from a soft magnetic material having high permeability and high saturation magnetic flux density, and extends substantially perpendicular to the ABS 13. The distal end portion **60*a* of the main pole 60 on the ABS 13 side is tapered down toward the ABS 13 and formed into a columnar shape with a narrow width relative to other portions. The distal end portion 60*a* of the main pole 60 slightly protrudes from the ABS 13 of the slider 15**.

The trailing shield 62 is formed from a soft magnetic material and is provided to efficiently close the magnetic path through the soft magnetic layer 102 of the magnetic disk 12 directly below the main pole 60. The trailing shield 62 is formed into an approximately L-shaped configuration, and its distal end portion **62*a* slightly protrudes from the ABS 13 of the slider 15. The trailing shield 62 includes a first connection portion 50 connected to the main pole 60. The first connection portion 50 is magnetically connected to the upper portion of the main pole 60, that is, the portion distant away from the ABS 13 of the main pole 60, via a non-conductive material 52. The first recording coil 70 is wound around the first connection portion 50, for example, in the first magnetic core. When writing a signal to the magnetic disk 12, a recording current is allowed to flow through the first recording coil 70, and thus the first recording coil 70 excites the main pole 60 and causes a magnetic flux to flow through the main pole 60**.

The leading shield 64, formed of a soft magnetic material, is disposed on the leading side of the main pole 60, so as to face the main pole 60. The leading shield 64 is formed into an approximately L-shaped configuration, and its distal end portion **64*a* slightly protrudes from the ABS 13 of the slider 15. The leading shield 64 has a second connection portion 68 that is joined to the main pole 60 at a location spaced apart from the ABS 13. The second connection portion 68 is, for example, formed of a soft magnetic material and is magnetically connected to the upper portion of the main pole 60, i.e., the portion of the main pole 60, which is spaced apart from the ABS 13, via a non-conductive material 69. With this configuration, the second connection portion 68 forms a magnetic circuit together with the main pole 60 and the leading shield 64. The second recording coil 72 is, for example, wound around the second connection portion 68** and arranged to apply a magnetic field to this magnetic circuit.

The first thermal actuator includes, for example, a heater **76*a*. The heater 76*a* is embedded within the protective insulating film 53 and located in the vicinity of the write head 58. The second thermal actuator includes, for example, a heater 76*b*. The heater 76*b* is embedded within the protective insulating film 53 and located in the vicinity of the read head 54**.

The thermal resistance sensor HR is embedded in the protective insulating film 53 and located between the write head 58 and the read head 54. The detection end (distal end portion) of the thermal resistance sensor HR is exposed to the ABS 13 or slightly protrudes from the ABS 13.

As shown in FIG. 3, at the trailing end **15*b* of the slider 15, multiple connection terminals 43 are provided. The first recording coil 70 and the second recording coil 72 are connected to the connection terminals 43, respectively, via wiring lines, and further connected to the head amplifier IC 30 via the flexure 28. When writing a signal to the magnetic disk 12, a recording current is supplied from the recording current supply circuit of the head amplifier IC 30 to the first recording coil 70 and the second recording coil 72, and thus the main pole 60 is excited, causing a magnetic flux to flow through the main pole 60. The recording current supplied to the first recording coil 70 and the second recording coil 72 is controlled by the main controller 40**.

The magnetoresistance element 55 of the read head 54 is connected to the connection terminal 43 via a wiring line (not shown), and further connected to the head amplifier IC 30 via the flexure 28. The signal read by the read head 54 is amplified by the head amplifier IC 30 and sent to the main controller 40.

The first heater **76*a* and the second heater 76*b* are connected to the connection terminals 43 via wiring lines, respectively, and further connected to the head amplifier IC 30 via the flexure 28. By applying drive power from the heater power supply circuit of the head amplifier IC 30 to the first heater 76*a* and the second heater 76*b*, the heaters and the surrounding areas thereof are heated, making it possible to cause the write head 58 or the read head 54 to swell out toward the magnetic disk 12. The heater power supplied to the first heater 76*a* and the second heater 76*b* is controlled by the heater control unit 46*c* of the main controller 40**.

The thermal resistance sensor HR is connected to the respective connection terminal 43 via a wiring line and further connected to the head amplifier IC 30 via the flexure 28. The detection signal (sensor output) from the thermal resistance sensor HR is sent to the defect detection circuit 46*f* of the main controller 40 via the head amplifier IC 30.

Figure 4:
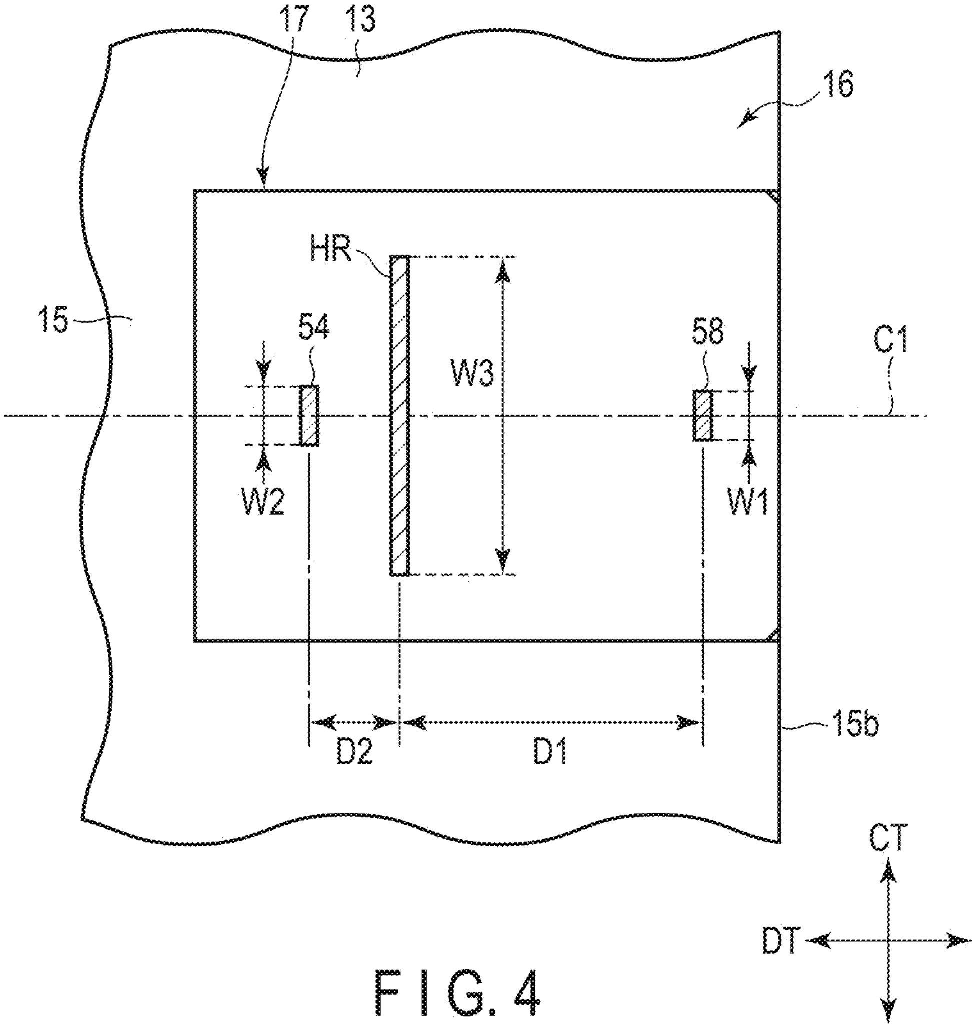
FIG. 4 is a plan view of the head portion of the magnetic head as viewed from an ABS side.

FIG. 4 is a plan view of the head portion 17 of the magnetic head 16 as viewed from the ABS 13 side. As shown in the figure, the write head 58, the thermal resistance sensor HR, and the read head 54 are arranged in order along the center axis C1 of the magnetic head 16 in the longitudinal direction (track circumferential direction DT). The distal end portion of the write head 58 exposed to the ABS 13 (distal end portion of the main pole) has a first width W1 along a direction perpendicular to the central axis C1. The distal end portion of the read head 54 exposed to the ABS 13 has a second width W2 along a direction perpendicular to the central axis C1. The distal end portion (detection end) of the thermal resistance sensor HR exposed to the ABS 13 has a third width W3 along a direction perpendicular to the central axis C1. The third width W3 is greater than the first width W1 and also greater than the second width W2.

The track width Wt of the recording tracks T1 to Tn formed on the magnetic disk 12 is approximately equal to the width W1 of the write head 58. More precisely, the track width Wt is equal to the width of the recording magnetic field generated by the write head 58. The width W3 of the thermal resistance sensor HR is sufficiently greater than the first width W1, and set to for example, several tens of times the width W1. In one example, when the track width Wt is 0.05 μm, the width W3 of the thermal resistance sensor is set to approximately 20 times thereof, that is, 1 μm.

According to this embodiment, in the ABS 13, the distal end portion of the write head 58, the distal end portion of the read head 54, and the distal end portion of the thermal resistance sensor HR are each placed such that the center in the width direction is located on the center axis C1 and are arranged horizontally symmetrical with respect to the center axis C1. In the ABS 13, the distal end portion of the thermal resistance sensor HR is located between the distal end portion of the write head 58 and the distal end portion of the read head 54. In this embodiment, the distance D1 between the write head 58 and the thermal resistance sensor HR along the direction parallel to the center axis C1, and the distance D2 between the read head 54 and the thermal resistance sensor HR are set such that D1>D2. Note that the distances D1 and D2 are not limited to those of this embodiment and may be modified in various ways.

Figure 5:
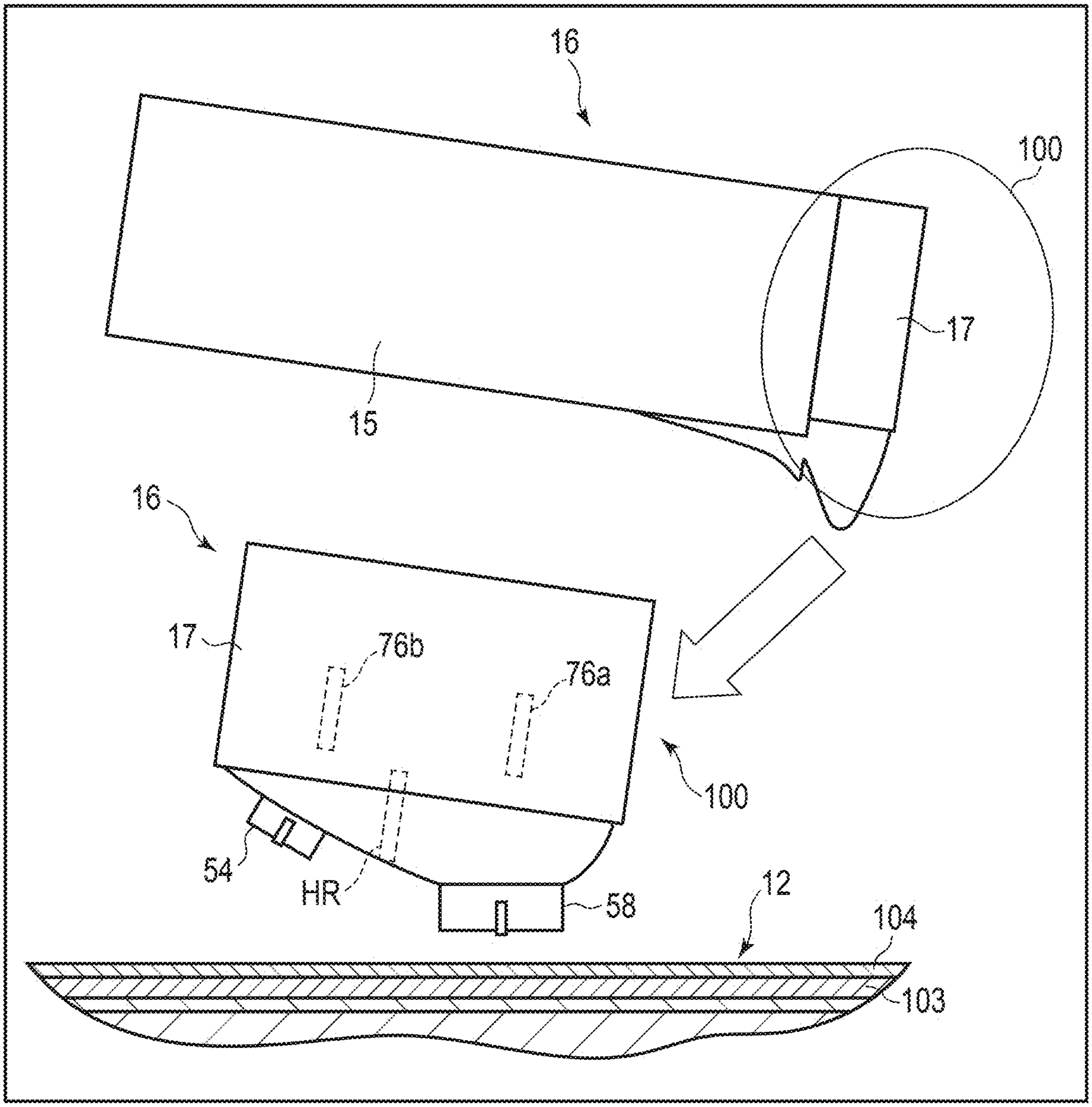
FIG. 5 is a side view schematically showing the magnetic head and the head portion in a state where the recording head portion is protruded by the thermal actuator.

FIG. 5 is a side view schematically showing the magnetic head and the head portion 17 in a state where the recording head portion is protruded by the thermal actuator. As shown in the figure, for example, when drive power is applied to the first heater 76*a*, the first heater 76*a* and its surrounding area are heated, and therefore the portion of the write head 58 swells out toward the magnetic disk 12. With this configuration, the gap (head flying amount) between the write head 58 and the surface of the magnetic disk 12 can be adjusted.

Figure 6:
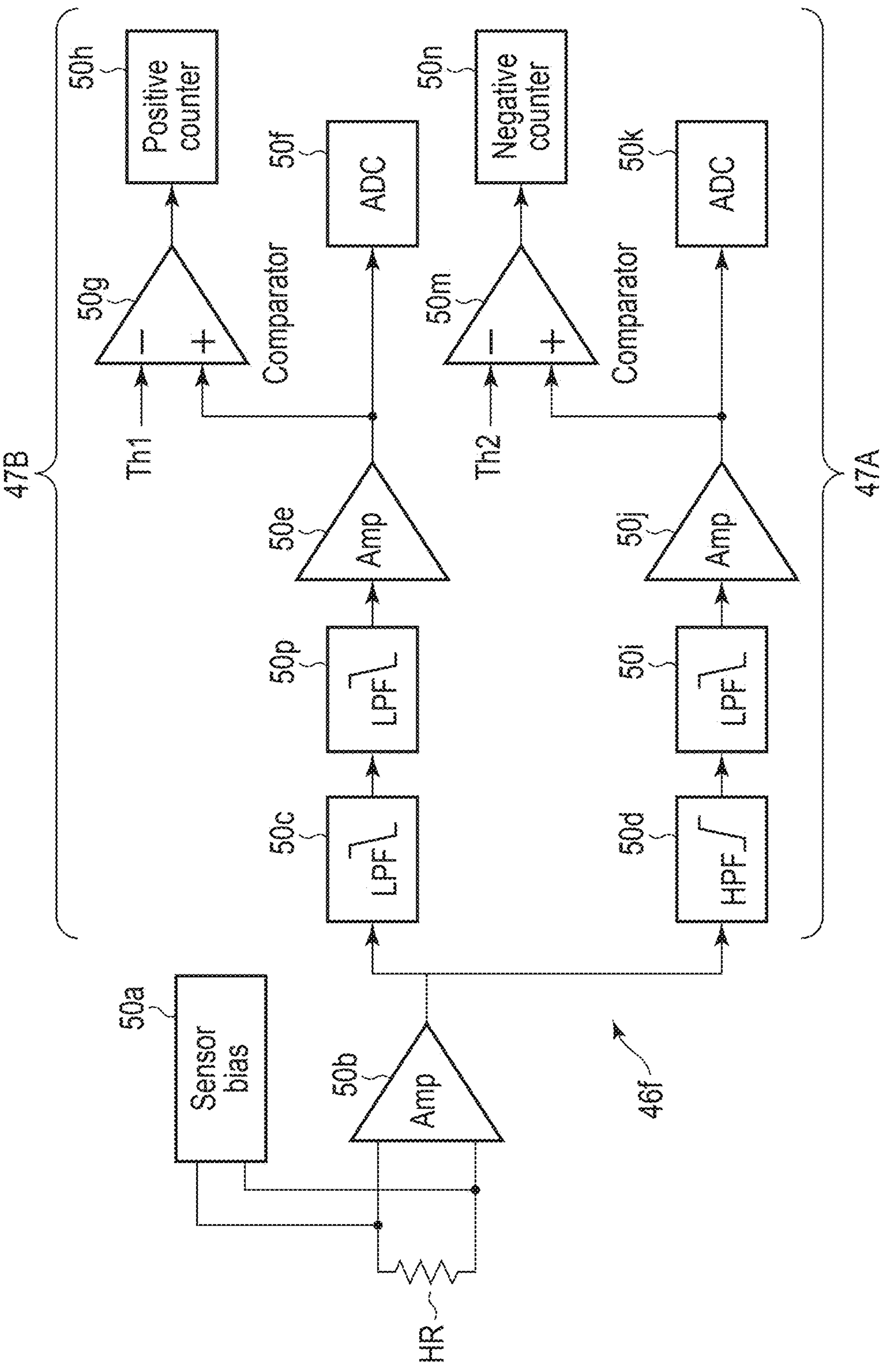
FIG. 6 is a circuit diagram of a defect detection circuit of the HDD.

FIG. 6 is a circuit diagram showing an example of the defect detection circuit. The defect detection circuit 46*f* comprises a dedicated frequency filter corresponding to the size of the defect to be detected, and determines the presence or absence of a defect based on whether or not the sensor output value of the thermal resistance sensor HR exceeds a predetermined defect detection threshold. Generally, when a defect is a protrusion, the resistance of the thermal resistance sensor decreases, resulting in a negative (minus) detection, and when a defect is a recess, the resistance of the thermal resistance sensor increases, resulting in a positive (plus) detection. To detect negative outputs and positive outputs separately, the defect detection circuit 46*f* includes two detection circuits, namely, a negative detection circuit 47A and a positive detection circuit 47B.

As shown in FIG. 6, in one example, the defect detection circuit 46*f* includes a sensor bias 50*a* that applies a bias voltage to the thermal resistance sensor HR, an amplifier (Amp) 50*b* that amplifies the resistance value (sensor output) of the thermal resistance sensor HR, a low-pass filter (LPF) 50*c*, and a high-pass filter 50*d*. Note that the sensor bias 50*a* and amplifier 50*b* may be configured within the head amplifier IC 30.

The positive detection circuit 47B of the defect detection circuit 46*f* includes a low-pass filter 50*c*, a low-pass filter (LPF) 50*p* following the low-pass filter 50*c*, an amplifier (Amp) 50*e* that amplifies the output signal of the low-pass filter 50*p*, an AD converter (ADC) 50*f*, a comparator 50*g* that compares the output signal of the amplifier 50*e* with a positive (plus) defect detection threshold Th1, and a positive counter 50*h* that counts the output signal of the comparator 50*g*. Further, the negative detection circuit 47A of the defect detection circuit 46*f* includes a high-pass filter 50*d*, a low-pass filter (LPF) 50*i* following the high-pass filter 50*d*, an amplifier (Amp) 50*j*, an AD converter (ADC) 50*k*, a comparator 50*m* that compares the output signal of the amplifier 50*j* with a negative (minus) defect detection threshold Th2, and a negative counter 50*n* that counts the output signal of the comparator 50*m*.

Next, the operation of detecting defects (protrusions or recesses) on the surface of the magnetic disk 12 and the operation of setting the record prohibition track or the record/read prohibition track in the HDD 10 configured as described above will be described. In this embodiment, the HDD 10 is configured to execute the defect detection of the magnetic disk 12 and the setting of the record prohibition track, for example, at the time of shipment of the product. As will be described later, the timing of performing the defect detection and the setting of write-prohibited tracks may not be limited to the time of shipment of the product but may as well be at regular intervals or after each recording operation.

Figure 7:
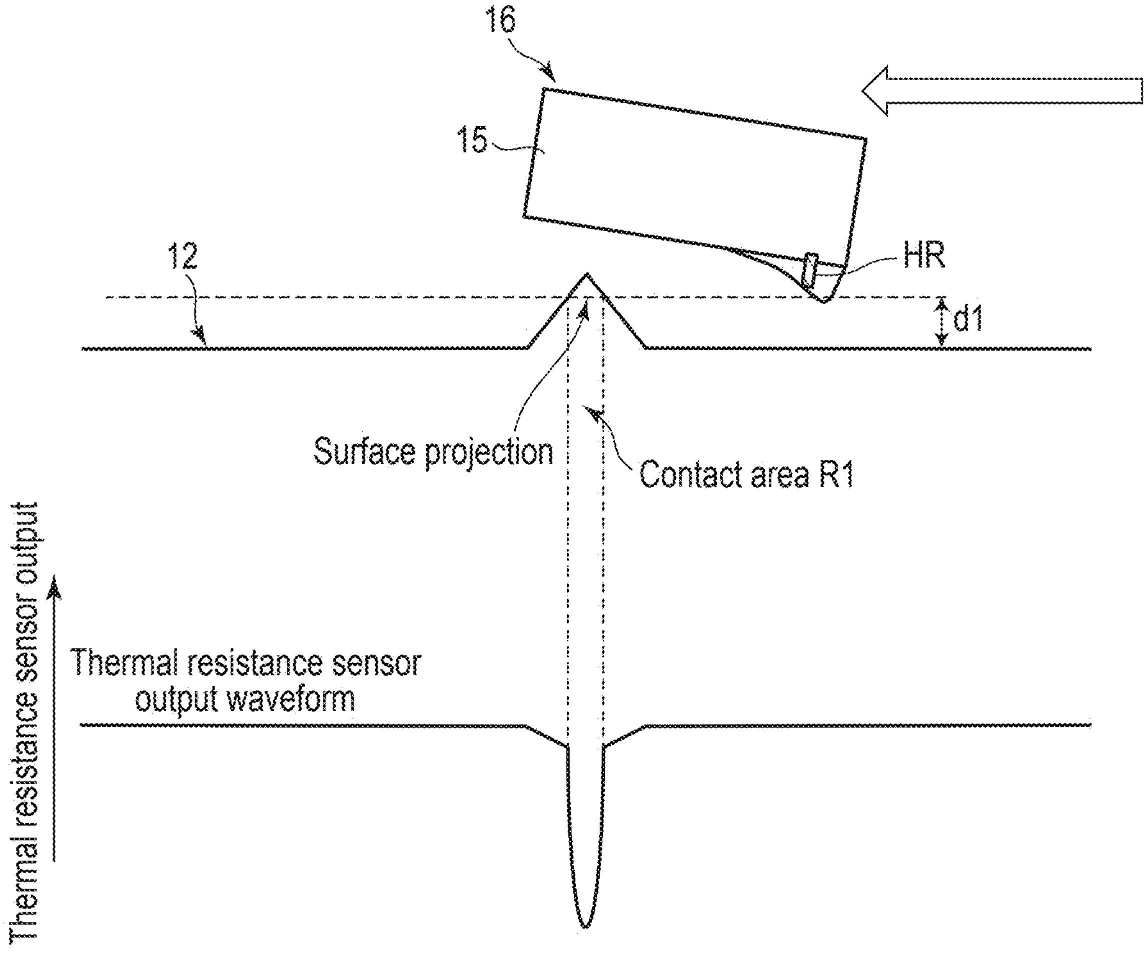
FIG. 7 is a schematic diagram showing an output of a thermal resistance sensor when brought into contact with a protrusion on the magnetic disk.
Figure 8:
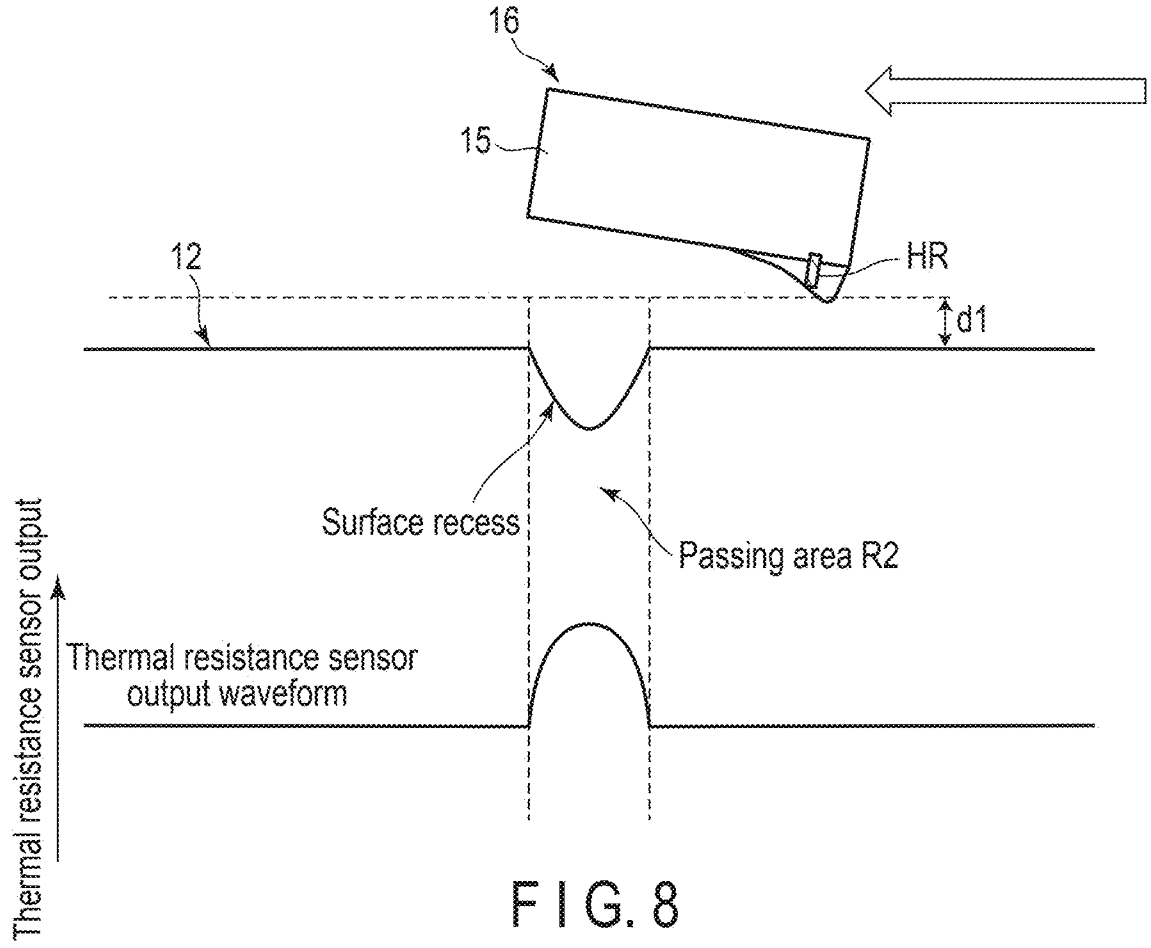
FIG. 8 is a schematic diagram showing the output of the thermal resistance sensor when passing through a recess on the magnetic disk.

FIG. 7 is a diagram schematically showing the output of the thermal resistance sensor when brought into contact with a protrusion on the surface of the magnetic disk, and FIG. 8 is a diagram schematically showing the output of the thermal resistance sensor when passing through a recess on the surface of the magnetic disk.

As shown in FIG. 7, in the case where a protrusion higher than the flying height d1 of the magnetic head 16 is created on the surface of the magnetic disk 12, when the thermal resistance sensor HR passes over the protrusion, it collides with the protrusion, causing the resistance value of the thermal resistance sensor HR to change, or more specifically, the resistance value decreases. As a result, the output waveform of the thermal resistance sensor HR takes such a shape that a portion corresponding to the contact area R1 is lowered.

As shown in FIG. 8, in the case where a recess is formed on the surface of the magnetic disk 12, when the thermal resistance sensor HR passes over the recess, the resistance value of the thermal resistance sensor HR increases. Therefore, the output waveform of the thermal resistance sensor HR takes such a shape that a portion corresponding to the passage area R2 over the recess is raised.

As described above, by observing and analyzing the output waveform of the thermal resistance sensor HR while scanning along each track of the magnetic disk 12 with the thermal resistance sensor HR, it is possible to detect the presence or absence of protrusions or recesses on the surface of the magnetic disk 12 and to determine whether they are protrusions or recesses. In other words, the defect detection circuit 46*f* of the main controller 40 processes the output signal (output waveform) sent from the thermal resistance sensor HR and thus detects the presence or absence of protrusions and recesses on the surface of the magnetic disk 12, determines whether they are protrusions or recesses, and also detects the locations of the protrusions and recesses.

As shown in FIG. 6, in the defect detection circuit 46*f*, the sensor output from the thermal resistance sensor HR is amplified by the amplifier 50*b* and then input to the positive detection circuit 47B when it is a positive output. The positive output is sent to the low-pass filter 50*c* and the low-pass filter 50*p*. The output signal from the low-pass filter 50*p* is amplified by the amplifier 50*e* and then sent to the comparator 50*g* and the AD converter 50*f*. The comparator 50*g* compares the input positive output signal with the positive defect detection threshold Th1. When the absolute value of the positive output signal is greater than the absolute value of the positive defect detection threshold Th1, a recess detection signal is output to the positive counter 50*h*.

In one example, the positive defect detection threshold Th1 is set to 60 to 90 mV. The positive counter 50*h* detects the dimensions (size) of the recess by counting the recess detection signals.

When the sensor output of the thermal resistance sensor HR is negative, the sensor output is amplified by the amplifier 50*b* and then input to the negative detection circuit 47A. The negative output is sent to the high-pass filter 50*d* and the low-pass filter 50*i*. The output signal from the low-pass filter 50*i* is amplified by the amplifier 50*j* and then sent to the comparator 50*m* and the AD converter 50*k*. The comparator 50*m* compares the input negative output signal with the negative defect detection threshold Th2. When the absolute value of the negative output signal is greater than the absolute value of the negative defect detection threshold Th2, protrusion detection signals are output to the negative counter 50*n*. In one example, the negative defect detection threshold Th2 is set to 60 to 90 mV. The negative counter 50*n* detects the size of the protrusion by counting the protrusion detection signals.

Figure 9:
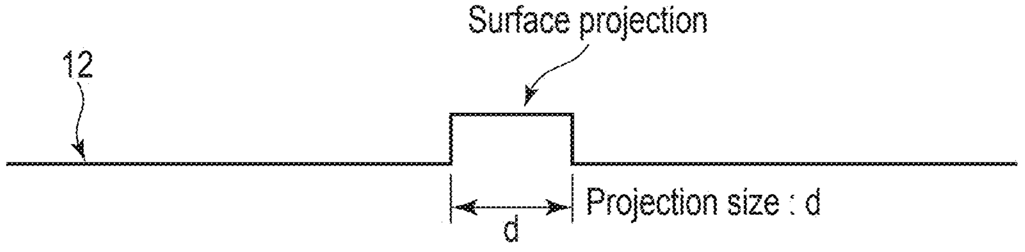
FIG. 9 is a schematic diagram showing a size (length of track in its circumferential direction) d of the surface protrusion.

FIG. 9 is a diagram schematically showing the size (length in the track circumferential direction) d of a defect, such as a surface protrusion. The size d of the protrusion corresponds to the count of the negative counter 50*n*, or to the length (length in the track circumferential direction) of the contact area R1 where the protrusion and the thermal resistance sensor HR are in contact with each other, as shown in FIG. 7.

As described above, when detecting a defect, such as a surface protrusion, the thermal resistance sensor HR approaches and contacts the surface protrusion, and thus the heat escapes to the magnetic disk, resulting in a decrease in temperature. As a result, the resistance value (sensor output) is decreased. Further, the amount of heat escaping from the thermal resistance sensor HR to the magnetic disk 12 increases as the contact time in which the thermal resistance sensor HR is in contact with the protrusion increases. Therefore, it is necessary to consider the contact time for defect detection.

Figure 10:
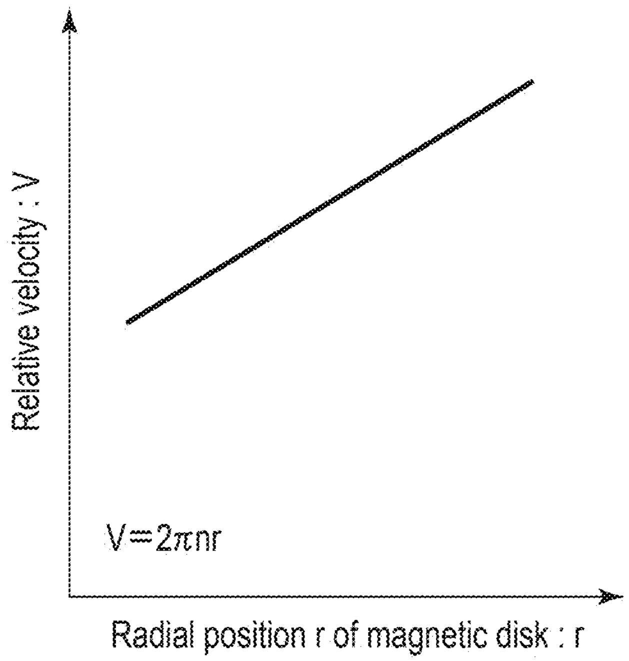
FIG. 10 is a schematic diagram showing the relative positions of the recording track during recording, with respect to reproduction and recording elements and the thermal resistance sensor.
Figure 11:
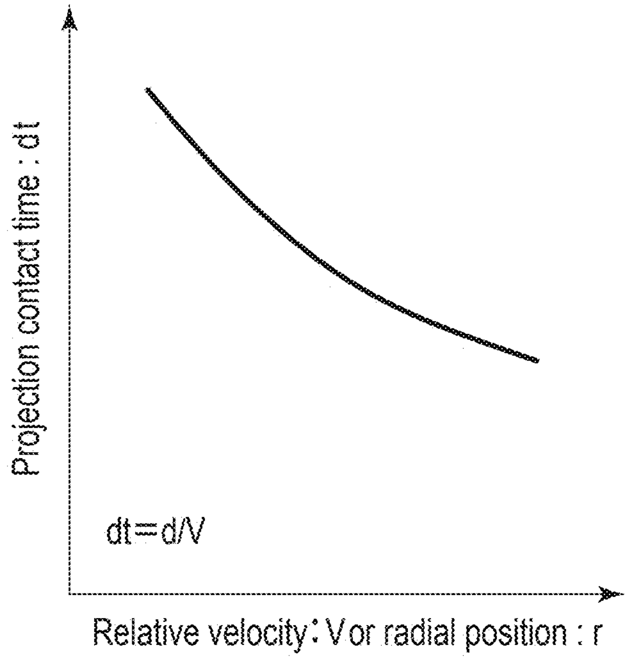
FIG. 11 is a schematic diagram showing the relative positions of the recording track during reproduction, the reproduction and recording elements, and the thermal resistance sensor.

FIG. 10 is a diagram showing the relationship between the relative velocity V between the magnetic disk and the magnetic head and the radial position r of the magnetic disk, and FIG. 11 is a diagram showing the relationship between the protrusion contact time dt and the relative velocity V.

Since the magnetic disk (recording medium) 12 rotates at a constant rotational speed n (rpm), the relative velocity V at a given radial position r on the magnetic disk 12 can be calculated as: $V=2\pi nr$. As shown in FIG. 10, as the radial position r increases, that is, as the location is closer to the outer circumferential side of the magnetic disk, the relative velocity V increases.

When the size of the surface protrusion is represented by its length, d, the contact time dt with the protrusion can be expressed as:

$dt=d/V=d/(2\pi nr)$. From this equation, it can be understood that even for the surface protrusions having the same size, the contact time between the thermal resistance sensor RH and the surface protrusions varies depending on the radial position r. As shown in FIG. 11, it can be seen that as the relative velocity V is higher, that is, as the radial position r is larger in value, the contact time dt becomes shorter.

Figure 12:
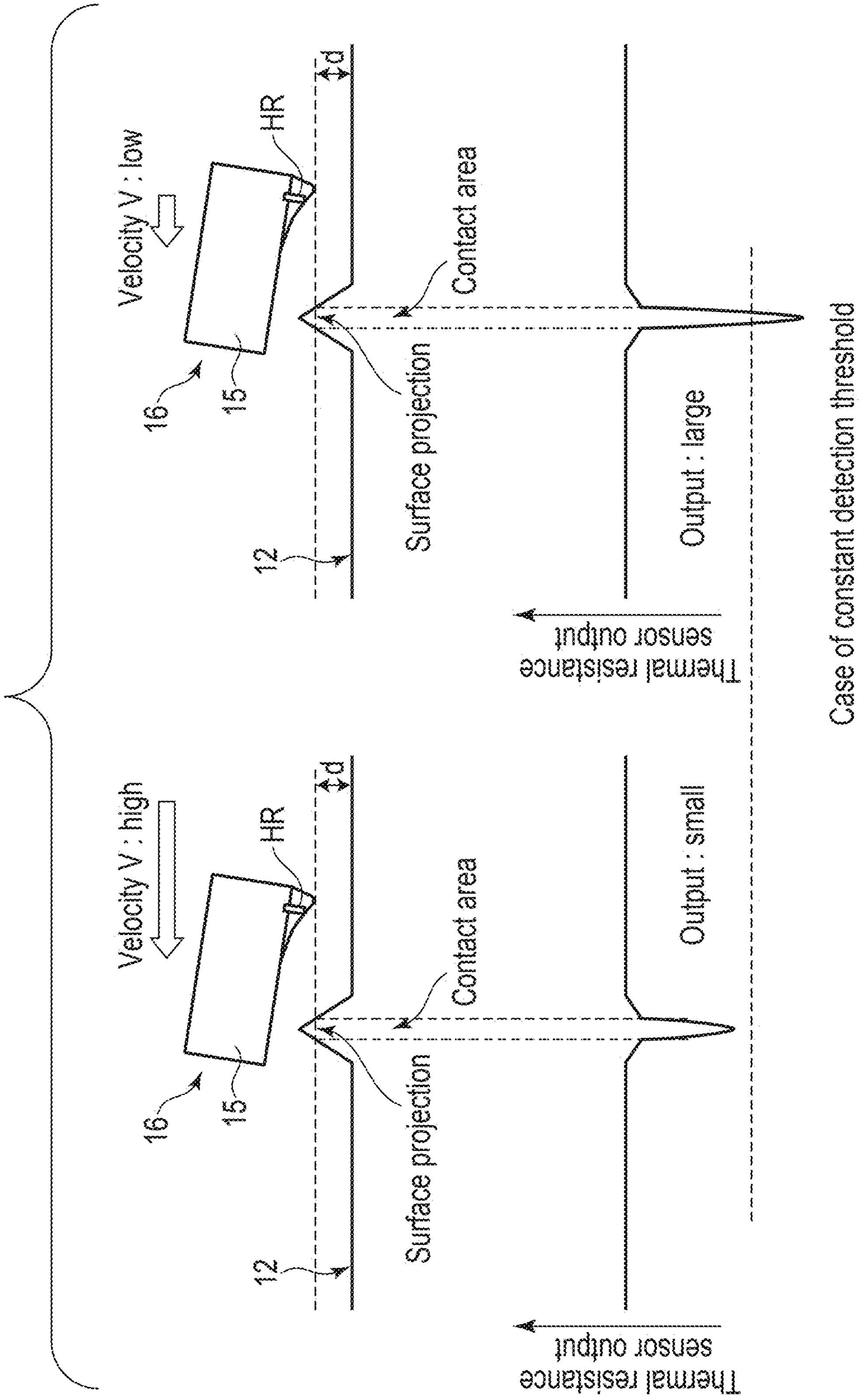
FIG. 12 is a schematic diagram showing the output of the thermal resistance sensor when the magnetic head is brought into contact with the protrusions on the magnetic disk surface, for cases where the relative velocity V of the magnetic head with respect to the magnetic disk surface is high and low.

FIG. 12 is a diagram schematically showing the output of the thermal resistance sensor when the magnetic head is brought into contact with protrusions on the magnetic disk surface in the cases where the relative velocity V of the magnetic head with relative to the surface of the magnetic disk is high and low.

As shown in FIG. 12, when the magnetic head 16 passes over protrusions of the same size, and the relative velocity V is high, the contact time between the thermal resistance sensor HR and the surface protrusions becomes shorter, and therefore the amount of heat escaping from the thermal resistance sensor HR is smaller. Accordingly, the sensor output (resistance change) of the thermal resistance sensor HR becomes smaller. Conversely, when the relative velocity V is low, the contact time becomes longer, and therefore the amount of heat escaping from the thermal resistance sensor HR is larger. Accordingly, the sensor output (resistance change) of the thermal resistance sensor HR becomes larger.

Figure 13:
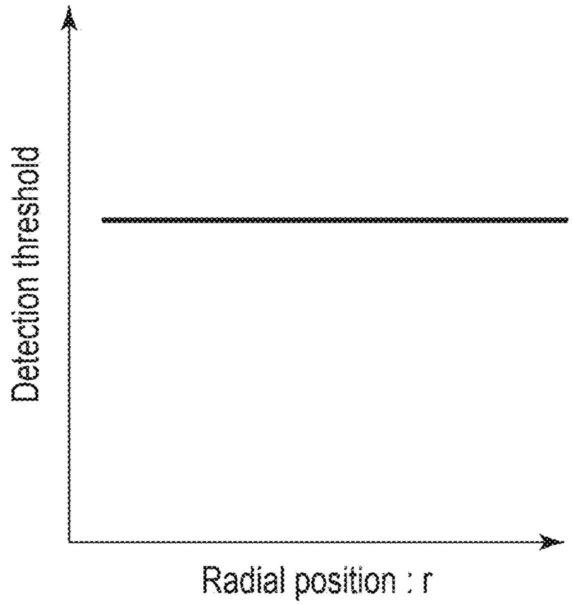
FIG. 13 is a diagram showing the relationship between the defect detection threshold (uniform) and the radial position r in a comparative example.
Figure 14:
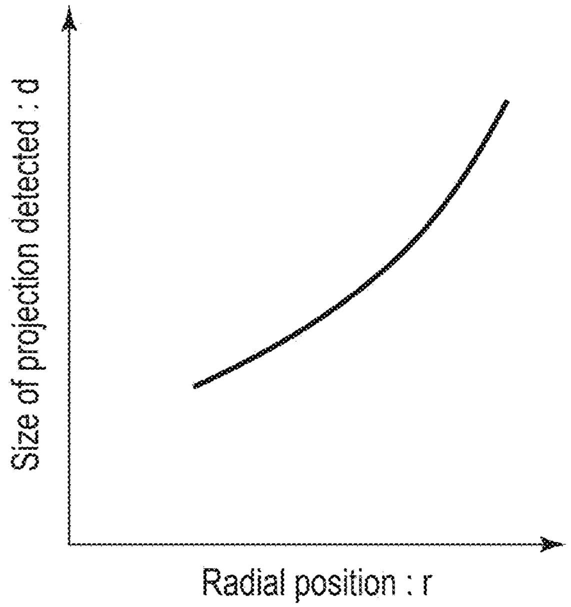
FIG. 14 is a diagram showing the relationship between the size d of the detected protrusion and the radial position r.

FIG. 13 is a diagram showing the relationship between the defect detection threshold and the radial position r in the comparative example, and FIG. 14 is a diagram showing the relationship between the size d of the detected protrusion and the radial position r.

As described above, as the radial position r is larger in value, that is, closer to the outer circumferential side of the magnetic disk, the relative velocity V becomes higher, the contact time becomes shorter, and the sensor output becomes smaller. Conversely, as the radial position r is smaller in value, that is, closer to the inner circumferential side of the magnetic disk, the relative velocity V becomes lower, the contact time becomes longer, and the sensor output becomes larger. Therefore, as shown in FIG. 13, when the defect detection thresholds Th2 (Th1) are uniformly set regardless of the radial position r, as shown in FIG. 14, the size d of the protrusions detected by the defect detection circuit varies depending on the radial position r. That is, despite of expecting to detect protrusions of the same size, the detected size increases from the inner circumference towards the outer circumferential side of the magnetic disk.

Figure 15:
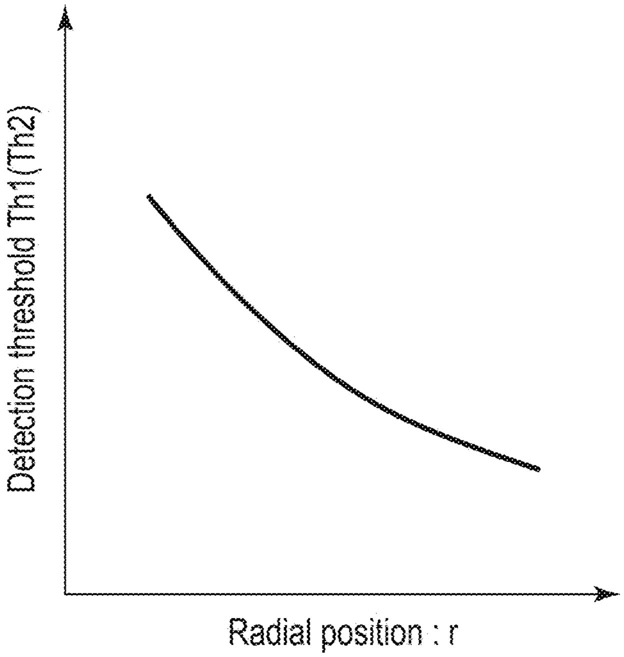
FIG. 15 is a diagram showing the relationship between the defect detection threshold (variable) and the radial position r in the present embodiment.

In the light of the above, according to the magnetic disk device and defect detection method of the present embodiment, the defect detection thresholds Th1 and Th2 used during defect detection are made variable based on the radial position r of the magnetic disk 12, and thus defects (protrusions or recesses) of the same size can be detected uniformly regardless of the radial position. In one example, as shown in FIG. 15, the defect detection thresholds Th1 and Th2 are made to have a dependency on the radial position r based on the contact time dt ($=d/V=d/(2\pi rn)$). That is, on the inner circumferential side of the magnetic disk 12, where the radial position r is smaller, the defect detection threshold is made larger, whereas on the outer circumferential side of the magnetic disk 12, where the radial position r is larger, the defect detection threshold is made smaller.

In one example, the defect detection threshold Th1 (Th2) is calculated using the following equation (1):

$$Th1(Th2)=\text{reference threshold } Th\times\alpha(1/(2\pi rn)\times R/r) \quad (1)$$

Here, α represents a radius-dependent coefficient, and R represents the radius at which the reference threshold Th1 (Th2) is defined.

Figure 16:
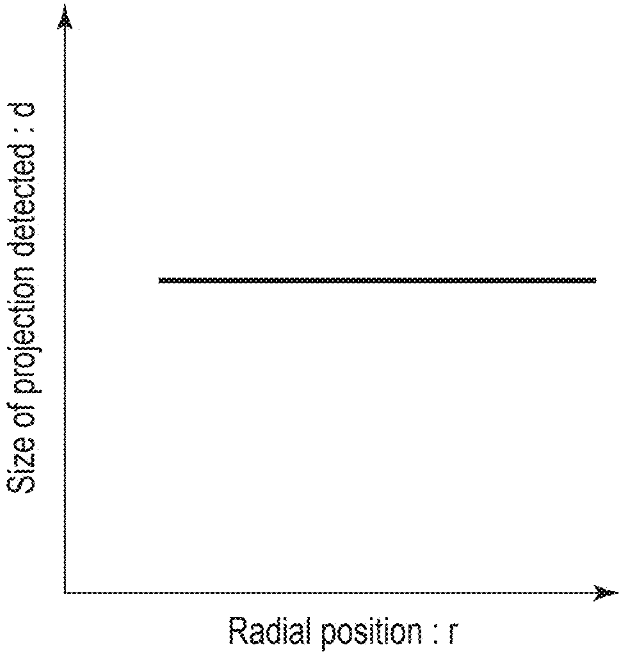
FIG. 16 is a diagram showing the relationship between the size d of the detected protrusions and the radial position r in the present embodiment.

With this configuration, the detection sensitivity for surface protrusions can be uniformly maintained regardless of the radius position r, as shown in FIG. 16. Not only for the surface protrusions, but also for the surface recesses, a similar detection sensitivity can be achieved.

In the defect detection operation, the position information read from the servo data area SW by the magnetic head 16 is input to the position detection circuit 46*d* of the MPU 46 via the head amplifier IC 30. The position detection circuit 46*d* detects the radial position r of the magnetic head 16 based on the position information and sends it to the adjustment circuit 46*e*. The adjustment circuit 46*e* calculates the defect detection thresholds Th1 and Th2 based on the input radial position r and the variable characteristics (d/V) of the threshold shown in FIG. 14, and inputs them into the comparators 50*m* and 50*g* of the defect detection circuit 46*f*, respectively. The comparators 50*m* and 50*g* compare the defect detection thresholds Th1 (Th2) changed according to the radial position r with the sensor output values of the thermal resistance sensor HR to detect defects (protrusions or recesses). In this operation, the defect detection circuit 46*f* can detect the presence or absence of defects with high accuracy over across the inner circumference towards the outer circumferential side of the magnetic disk 12 with uniform detection sensitivity.

The setting circuit 46*g* sets the track where a defect is detected as a write-prohibited track and/or a read-prohibited track and registers it in the memory 47. In this operation, the likelihood of the magnetic head 16 remaining on the track where a defect is detected, can be reduced, thereby making it possible to prevent damage to the recording head and reproduction head caused by defects.

According to the magnetic disk device and defect detection method of the present embodiment, configured as described above, the defect detection threshold (Th1, Th2) is made variable according to the radial position on the magnetic disk, in the defect detection of the surface of the magnetic disk, and therefore it is possible to achieve a uniform defect detection quality between the inner circumferential side and outer circumferential side of the magnetic disk. As a result, according to the present embodiment, it is possible to provide a magnetic disk device and defect detection method with improved reliability, which can prevent degradation or damage of the magnetic head caused by defects on the recording medium.

Next, HDDs and defect detection methods according to other embodiments will be described. In the other embodiments described below, the parts the same as those of the first embodiment are denoted by the same reference numerals and the detailed descriptions thereof are omitted or simplified. The parts that differ from those of the first embodiment will be focused.

Second Embodiment

An HDD of the second embodiment is configured such that defect detection is executed for a specific track during a retry operation.

In a magnetic disk device, such as an HDD, when it is determined that the recording/reproduction quality is not guaranteed during a write operation or a read operation, a retry operation is performed, in which the write operation or read operation is performed once again on the specified track. In this embodiment, during the retry operation, the controller 40 of the HDD executes the above-described defect detection using a defect detection threshold value according to the radial position of the specified track.

If it is determined that the track contains a defect (protrusion or recess), the controller 40 of the HDD may set and register the track as a track prohibited from recording or reading. Note that defects detected during the retry operation are assumed to be defects whose form has changed (such as a change in height) from those that could not be detected before product shipment, or defects caused by contamination.

According to the second embodiment described above, advantageous effects similar to those of the first embodiment described above can be obtained as well. Further, in the second embodiment, the defect detection is executed again during the retry operation in addition to the defect detection at the time of product shipment, and therefore it is possible to obtain a magnetic disk device and a defect detection method with further improved reliability.

Third Embodiment

An HDD of the third embodiment is configured such that the defect detection is executed during the seek operation (movement in the radial direction of the magnetic disk) of the magnetic head.

When performing a seek operation over a short distance, such as a few tracks in the HDD, there are some cases where the seek operation is performed without cutting off the power supply to the thermal actuator (heater) from the perspective of device performance, that is, the seek operation is performed while maintaining the flying amount of the magnetic head at a predetermined value. In the third embodiment, during such short-distance seek operations, the controller 40 enables defect detection by the thermal resistance sensor HR and executes the defect detection for several tracks. The controller 40 executes the above-described defect detection using the defect detection thresholds corresponding to the radial positions of several tracks. Here, when it is determined that a track contains a defect (protrusion or recess), the controller 40 may record the track, set it as a read-prohibited track, and register it.

According to the third embodiment described above, advantageous effects similar to those of the first embodiment described above can be obtained as well. Further, according to the third embodiment, the defect detection is executed again during seek operation in addition to the defect detection at the time of product shipment, and therefore it is possible to obtain a magnetic disk device and defect detection method with further improved reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the defect detection circuit is configured to be divided into a positive detection circuit and a negative detection circuit, but the configuration is not limited to this. When the detection process is performed using the absolute value of the sensor output, it can be configured by a single detection circuit. The defect detection may be performed not only at the time of product shipment, retry operation, or seek operation, but may as well be executed at regular intervals, at each recording operation, or at any other arbitrary timing.

What is claimed is:

1. A magnetic disk device comprising:

a disk-shaped recording medium including a magnetic recording layer;

a magnetic head that processes information on the magnetic recording layer;

a thermal resistance sensor provided on the magnetic head, that detects a surface condition of the magnetic recording layer; and a controller comprising a defect detection circuit that detects presence or absence of a defect by comparing an output of the thermal resistance sensor with a defect detection threshold, a position detection circuit that detects a radial position of the magnetic head relative to the recording medium, and an adjustment circuit that adjusts the defect detection threshold in accordance with a detected radial position.

2. The magnetic disk device of claim 1, wherein the adjustment circuit lowers the defect detection threshold as the radial position moves from an inner circumferential side to an outer circumferential side of the recording medium.

3. The magnetic disk device of claim 1, wherein when a rotational speed of the recording medium is represented by n (rpm) and the radial position of the magnetic head is represented by r, the adjustment circuit varies the defect detection threshold in proportion to $1/(2\pi rn)$.

4. The magnetic disk device of claim 1, wherein the controller includes a setting circuit that sets a track containing the defect as a recording-prohibited track when the defect is detected by the defect detection circuit.

5. The magnetic disk device of claim 1, wherein the magnetic head includes a thermal actuator that adjusts a flying amount of the magnetic head, and the controller detects the presence or absence of a defect by the defect detection circuit during execution of a seek operation of the magnetic head in a radial direction of the recording medium while maintaining power supply to the thermal actuator.

6. A method of detecting a defect on a surface of a disk-shaped recording medium, the method comprising:

scanning the surface of the recording medium in a track direction with a thermal resistance sensor provided on a magnetic head;

detecting presence or absence of a defect on the surface of the recording medium based on an output value of the thermal resistance sensor and a defect detection threshold;

detecting a radial position of the magnetic head on the surface of the recording medium; and changing the defect detection threshold in accordance with the detected radial position.

7. The method of claim 6, wherein when a rotation speed of the recording medium is represented by n (rpm) and the radial position of the magnetic head is represented by r, the defect detection threshold is varied in proportion to $1/(2\pi rn)$.

8. The method of claim 6, wherein during a recording operation or a reading operation by the magnetic head, when a retry operation occurs, the detection of a defect is executed during the retry operation.

9. The method of claim 6, wherein when seeking the magnetic head from one track to another track of the recording medium, the detection of a defect is executed while maintaining power supply to a thermal actuator provided in the magnetic head.

10. The method of claim 6, wherein when the defect is detected, the track where the defect exists is set as a recording-prohibited track.

* * * * *